United States Patent [19]
Hawkins et al.

[11] Patent Number: 5,903,998
[45] Date of Patent: May 18, 1999

[54] FISHING DEVICE

[76] Inventors: William M. Hawkins, Rte. #1, Box 32A, Kite, Ga. 31049; James N. Holton, Rte. #1, Box 2660, Wrightsville, Ga. 31096

[21] Appl. No.: 09/004,094

[22] Filed: Jan. 7, 1998

[51] Int. Cl.⁶ ..................................................... A01K 97/12
[52] U.S. Cl. ................................................................. 43/15
[58] Field of Search ................................. 43/15, 16, 21.2

[56] References Cited

U.S. PATENT DOCUMENTS

| | | | |
|---|---|---|---|
| 4,159,589 | 7/1979 | Pendegraft | 43/15 |
| 4,197,668 | 4/1980 | McKinsey | 43/15 |
| 4,676,018 | 6/1987 | Kimball | 43/15 |
| 4,750,286 | 6/1988 | Gray . | |
| 5,050,332 | 9/1991 | Cross . | |
| 5,076,001 | 12/1991 | Coon et al. . | |
| 5,359,802 | 11/1994 | Gutierrez . | |
| 5,491,923 | 2/1996 | Zingrone . | |
| 5,542,205 | 8/1996 | Updike | 43/15 |
| 5,570,534 | 11/1996 | Ford . | |

Primary Examiner—Thomas Price
Attorney, Agent, or Firm—Richard C. Litman

[57] ABSTRACT

A fishing rod holder and pivoting fishing device that in response to a bite from a fish automatically sets the hook by raising the fishing rod. The device comprises a frame assembly including a generally vertical support member which may be attached to a boat, into the ground or some other appropriate location. A generally horizontal member supports a rod holding bracket. Along the back end of the device a helical spring member under tension allows the device to pivot rapidly in a generally upward direction to set the hook once a fish strikes the line. Further, the amount of axial displacement necessary to spring the device and set the hook may be adjusted to account for various types of fish or fishing conditions. The device further includes an audio and visual strike indicator that is easily removed from the device, and allows rapid removal of the fishing rod from the device in order to initiate the manual manipulation of the fishing rod required to land the fish.

3 Claims, 3 Drawing Sheets

FISHING DEVICE

BACKGROUND OF THE INVENTION

1. FIELD OF THE INVENTION

The present invention relates to fishing apparatus, and more specifically to a fishing rod holder and pivoting fishing device that, in response to a strike from a fish, automatically sets the hook by raising the fishing rod.

2. DESCRIPTION OF THE RELATED ART

Devices have been proposed by which a fishing rod may be held and the strike of a fish triggers rapid movement of the fishing rod to set the hook, thereby automatically catching a fish. Such devices are well known in the art as evidenced by the U.S. Patents to Gray, U.S. Pat. No. 4,750,286; Cross, U.S. Pat. No. 5,050,332; Coon et al., U.S. Pat. No. 5,076,001; Gutierrez, U.S. Pat. No. 5,359,802; Zingrone, Pat. No. 5,491,923; Updike, U.S. Pat. No. 5,542,205; and Ford, U.S. Pat. No. 5,570,534.

The patent to Zingrone disclose a fishing rod holder wherein the holder is pivotally mounted to a support. The patent to Cross discloses a fishing rod holder, which swings upward to hook a fish, hingedly mounted to a support member having an adjustable trigger, a coil spring, and a visual indicator flag. The patent to Gray discloses a fish catching device that includes both audio and visual indication of that a fish has been caught. In addition, the trigger mechanism is tripped by tension placed on the fishing line. The patents to Coon et al., Gutierrez, and Updike also show line activated hook setting fishing rod holders. The patent to Ford discloses a motorized fishing jigger and hook setting device which may be coupled to an alarm that indicated activation of the hook setting mechanism.

However none of the prior art fishing devices allow for rapid removal of the fishing rod from the device in order to initiate the manual manipulation of the fishing rod required to land the fish. Nor do any of the prior art fishing devices include a easily removable battery operated sound producer and illumination device activated by a mercury bulb switch as audio and visual indicators that a fish has been hooked.

None of the above inventions and patents, taken either singularly or in combination, is seen to describe the instant invention as claimed. Thus a fishing device solving the aforementioned problems is desired.

SUMMARY OF THE INVENTION

The invention is a fishing rod holder and pivoting fishing device that in response to a bite from a fish automatically sets the hook by raising the fishing rod. The device comprises a frame assembly including a generally vertical support member which may be attached to a boat, into the ground or some other appropriate location. A generally horizontal member supports a rod holding bracket. Along the back end of the device a helical spring member under tension allows the device to pivot rapidly in a generally upward direction to set the hook once a fish strikes the line. Further, the amount of axial displacement necessary to spring the device and set the hook may be adjusted to account for various types of fish or fishing conditions. The device further includes a battery operated audio and visual strike indicator that is easily removed from the device and allows rapid removal of the fishing rod from the device in order to initiate the manual manipulation of the fishing rod required to land the fish.

Accordingly, it is a principal object of the invention to provide a fishing rod holder and pivoting fishing device that in response to a bite from a fish automatically sets the hook by raising the fishing rod.

It is another object of the invention to provide a battery operated audio and visual strike indicator that is easily removed from the device.

It is a further object of the invention to provide a fishing rod holder allows rapid removal of the fishing rod from the device in order to initiate the manual manipulation of the fishing rod required to land the fish.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
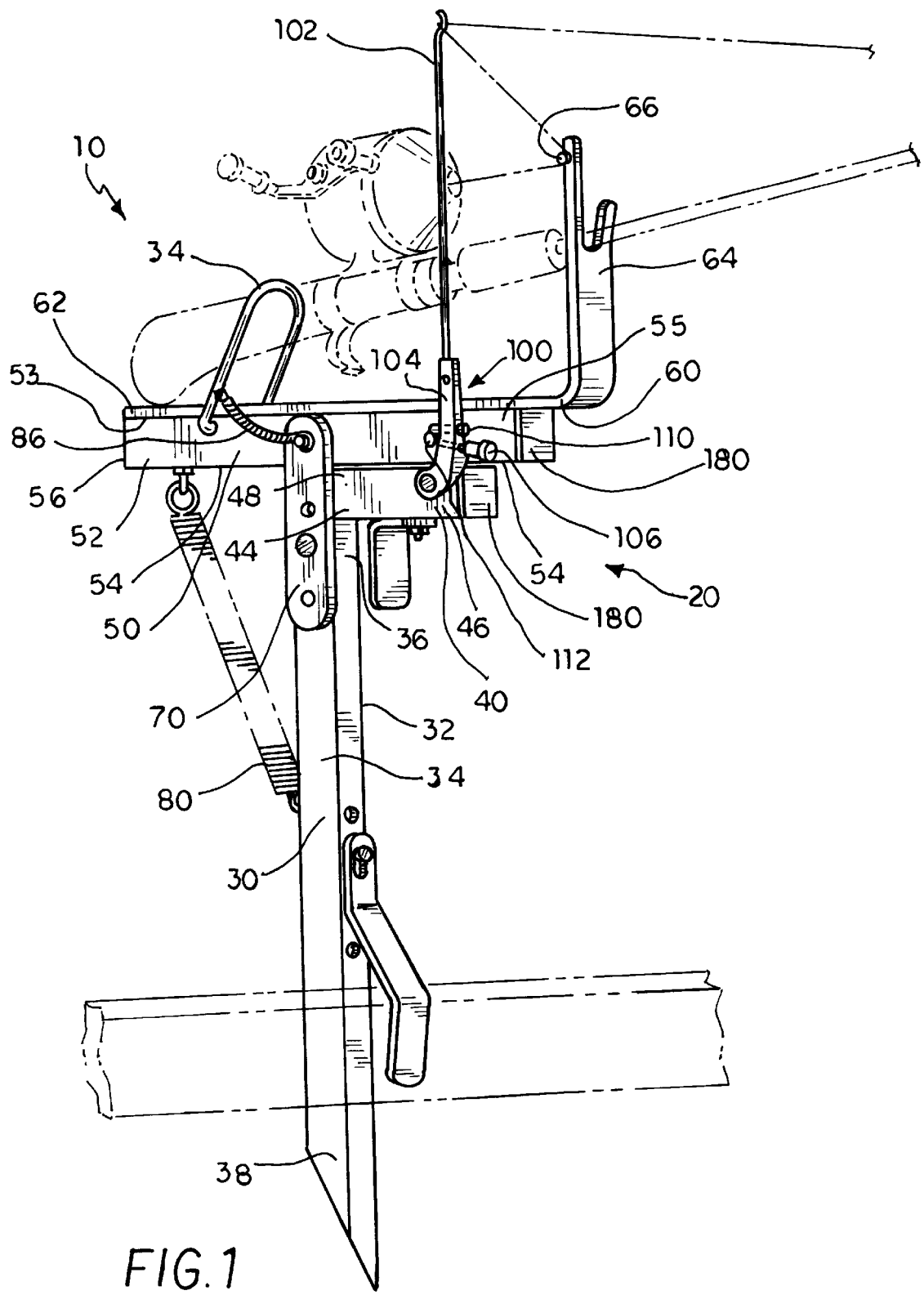
FIG. 1 is a perspective view of the fishing device in a cocked position according to the present invention.

Referring to the figures by numerals of reference, a fishing device generally designated by the reference numeral 10 will be described.

Referring to FIG. 1, the frame assembly 20 of the fishing device includes a vertical support member 30, a trigger support member 40, a pivot member 50, a rod holding bracket 60, a line guide 66, a rod handle stop 68, a right pivot brace 70, a left pivot brace 76, a main helical spring 80, a U-shaped retaining bar 84, and a return spring 86. The trigger assembly 100 includes a trip rod 102, a trigger body 104, a sensitivity adjustment screw 106, a trigger pin 110, and a trigger stud 112.

Figure 3:
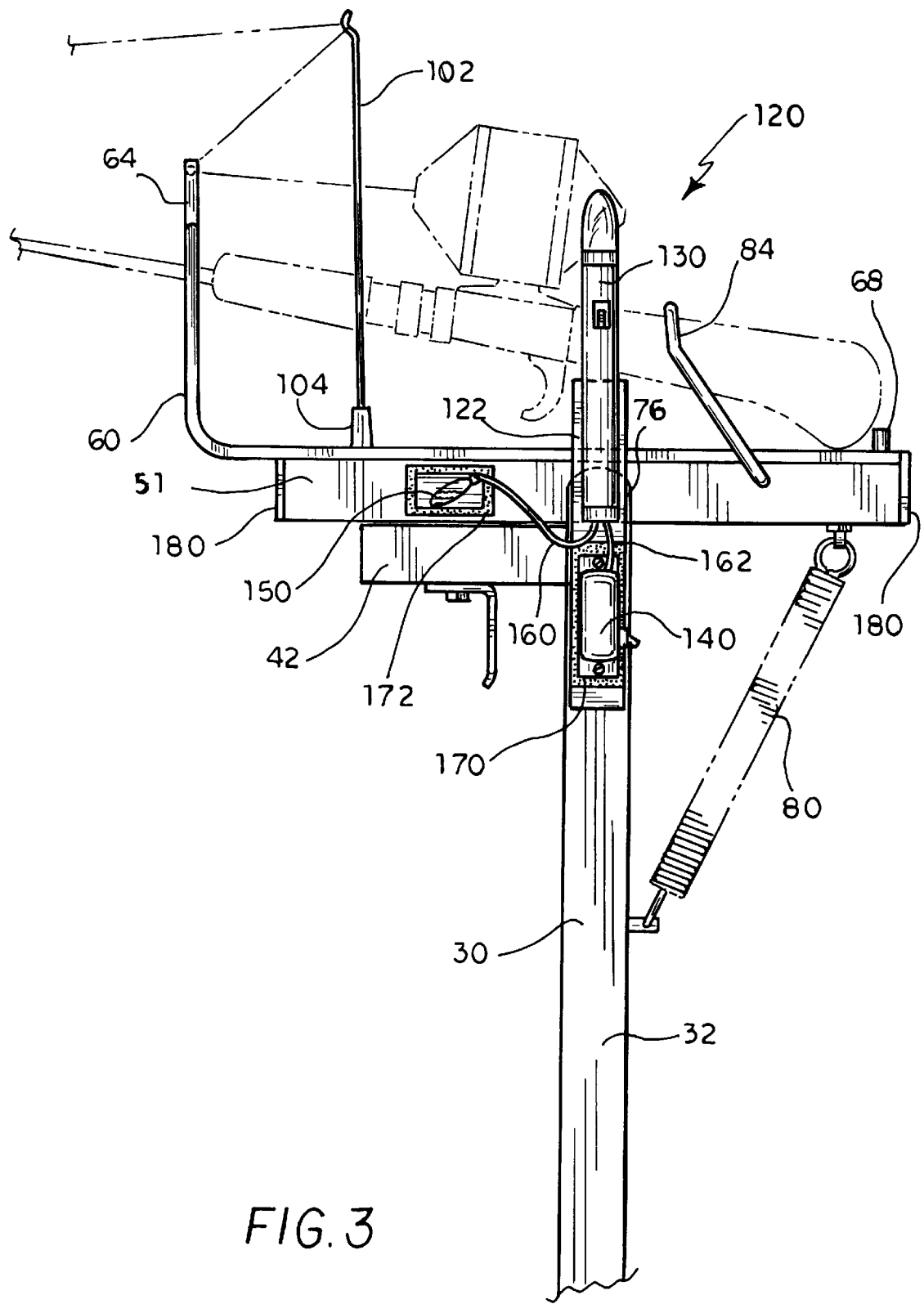
FIG. 3 is a side view of the fishing device including the audio and visual indicators.

Referring to FIG. 3, the strike indicator 120 includes a mounting bracket 122, a battery powered pen light 130, a buzzer 140, a mercury bulb switch 150, a pair of connective wires 160, 162, and a first hook and loop fastener mounting pad 170 and a second hook and loop fastener mounting pad 172.

Referring again to FIG. 1, the vertical support member 30 is an elongate square tube having a left side 32, a right side 34, a top end 36, and bottom end 38. The trigger support member 40 is a square tube having a left side 42, a right side 44, a front end 46, and a back end 48. The pivot member 50 is a square tube having a left side 51, a right side 52, a top 53, a bottom 54, a front 55, and a back 56. A plurality of square plastic end caps 180 are inserted into the exposed ends of the square tubes of said frame assembly 20. The rod holding bracket 60 is an L-shaped bar having back end 62 and a forked front end 64. The back 48 of the trigger support member 40 is attached perpendicularly to the top end 36 of the vertical support member 30. The pivot member 50 is pivotally attached to the vertical support member 30 via the right pivot brace 70 and the left pivot brace 76. The rod holding bracket 60 is attached to the top 53 of the pivot member 50. The U-shaped retaining bar 84 is attached to the back 56 of the pivot member 50. The return spring 86 is attached to the U-shaped retaining bar 84 and the right pivot brace 70. The rod holding bracket 60 has a rod handle stop 68 protruding upward therefrom proximate the back end 62 and a line guide 66 attached to the forked front end 64. The trigger body 104 is pivotally attached to the right side 44 of the trigger support member 40 proximate the front end 46 thereof. The trip rod 102 extends from the free end of the trigger body, The trigger stud 112 is attached to the right side 52 of the pivot member 50, protruding therefrom proximate the front 55 thereof.

The trigger pin 110 is attached to the trigger body 104 perpendicular to the trigger stud 112 such that the trigger pin 110 frictionally engages the trigger stud 112 when the trigger body 104 is pivoted toward the trigger stud 112. The sensitivity adjustment screw 106 passes through the trigger body. 104 and by rotating the screw 106 the relationship between the trigger pin 110 and the trigger stud 112 is altered, thereby altering the degree of frictional engagement therebetween.

Figure 2:
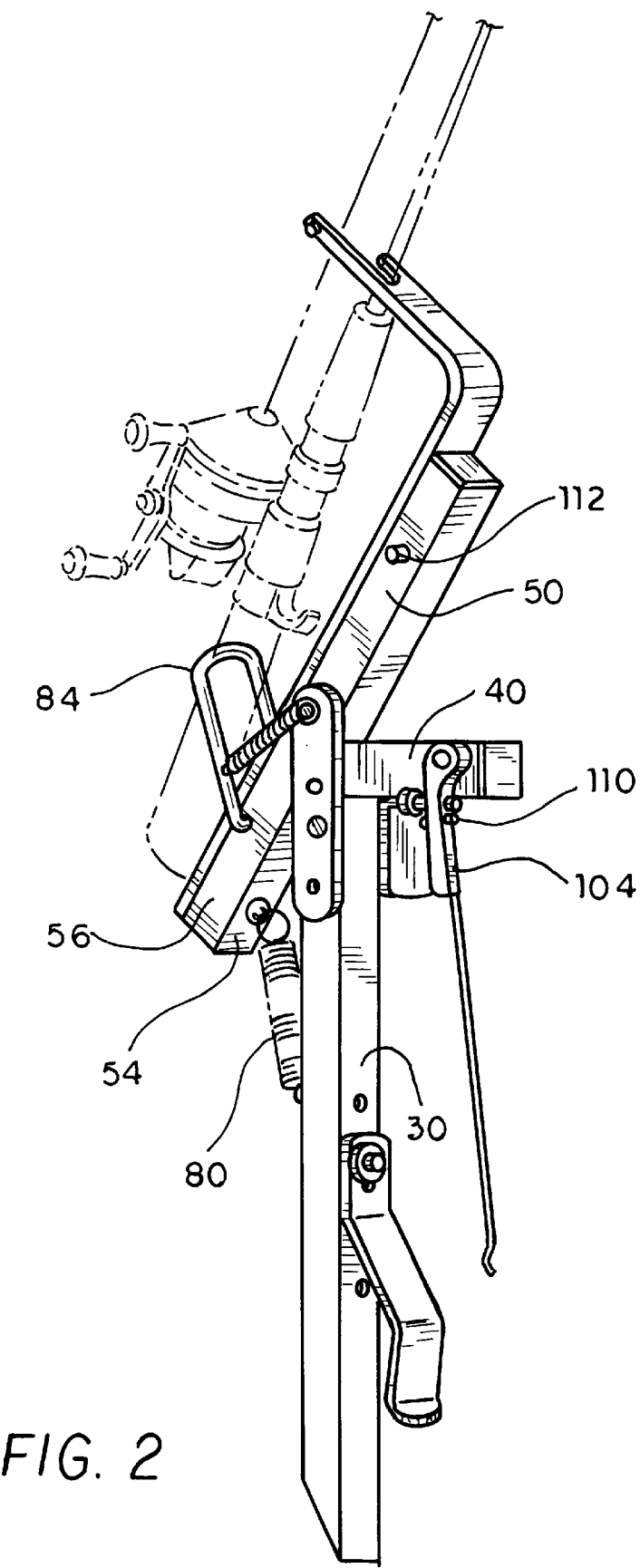
FIG. 2 is a perspective view of the fishing device after actuation.

Referring to FIG. 2, the main helical spring 80 is attached to the bottom 54 of the pivot member 50 proximate the back 56 thereof and to the vertical support member 30. The main coil spring 80 biases the back 56 of the pivot member 50 toward the vertical support member 30 when the trigger stud 112 is unencumbered by friction engagement with the trigger pin 110.

Referring to FIG. 3, the mounting bracket 122 is attached to the left side 32 of the vertical support member 30 by the first hook and loop fastener mounting pad 170 proximate the top end 36 thereof. The buzzer 140 is attached to the mounting bracket 122. The battery powered pen light 130 is also attached to the mounting bracket 122. The mercury bulb switch 150 is attached to the left side 51 of the pivot member 50 by the second hook and loop fastener pad 172. The mercury bulb switch 150 closes a circuit comprising the battery powered pen light 130, the buzzer 140, and the connective wires 160, 162 when the main coil spring 80 biases the 5 back end 56 of the pivot member 50 toward the vertical support member 30 thereby activating the audio and visual indicators.

It is to be understood that the present invention is not limited to the embodiment described above, but encompasses any and all embodiments within the scope of the following claims.

We claim:

1. A fishing device comprising:
    a frame assembly including a vertical support member, a trigger support member, a pivot member, a rod holding bracket, a line guide, a rod handle stop, a right pivot brace, a left pivot brace, a main helical spring, a U-shaped retaining bar, and a return spring;
    a trigger assembly including a trip rod, a trigger body having a free end, a sensitivity adjustment screw, a trigger pin, and a trigger stud; and
    a strike indicator including a mounting bracket, a battery powered pen light, a buzzer, a mercury bulb switch, a pair of connective wires, and a first hook and loop fastener mounting pad and a second hook and loop fastener mounting pad; wherein
        said vertical support member is an elongate square tube having a left side, a right side, a top end, and bottom end;
        said trigger support member is a square tube having a left side, a right side, a front end, and a back end;
        said pivot member is a square tube having a left side, a right side, a top, a bottom, a front end, and a back end;
        said rod holding bracket is an L-shaped bar having back end and a forked front end;
        said back of said trigger support member is attached perpendicularly to said top of said vertical support member;
        said pivot member is pivotally attached to said vertical support member via said right pivot brace and said left pivot brace;
        said rod holding bracket is attached to said top of said pivot member;
        said U-shaped retaining bar is attached to said back of said pivot member;
        said return spring is attached to said U-shaped retaining bar and said right pivot brace;
        said rod holding bracket has said rod handle stop protruding upward therefrom proximate said back end and said line guide is attached to said forked front end;
        said trigger body is pivotally attached to said right side of said trigger support member proximate said front end thereof;
        said trip rod extends from said free end of said trigger body;
        said trigger stud is attached to said right side of said pivot member protruding therefrom proximate said front thereof;
        said trigger pin is attached to said trigger body perpendicular to said trigger stud such that said trigger pin frictionally engages said trigger stud when said trigger body is pivoted toward said trigger stud;
        said sensitivity adjustment screw passes through said trigger body and by rotating said screw the frictional relationship between said trigger pin and said trigger stud is altered thereby altering the degree of frictional engagement therebetween;
        said main helical spring is attached to said bottom of said pivot member proximate said back thereof and to said vertical support member;
        said main helical spring biases said back end of said pivot member toward said vertical support member when said trigger stud is unencumbered by friction engagement with said trigger pin;
        said mounting bracket is attached to said left side of said vertical support member by said first hook and loop fastener mounting pad proximate said top end thereof;
        said buzzer is attached to said mounting bracket;
        said battery powered pen light is attached to said mounting bracket;
        said mercury bulb switch is attached to said left side of said pivot member by said second hook and loop fastener pad;
        said mercury bulb switch closes a circuit comprising said battery powered pen light, said buzzer, and said connective wires when said main helical spring biases said back end of said pivot member toward said vertical support member.

2. The fishing device as defined in claim 1, including a plurality of square plastic end caps, each inserted into the front and back ends of the square tubes of said trigger support member and said pivot member.

3. The fishing device as defined in claim 1, wherein said U-shaped retaining bar and said trip rod have protective rubber coatings.

* * * * *